United States Patent

Deterling

[15] 3,704,517

[45] Dec. 5, 1972

[54] ROTATING ROD SAW AND METHOD OF MAKING SAME

[72] Inventor: Thomas M. Deterling, 660 via Zapata, Riverside, Calif. 92507

[22] Filed: Dec. 7, 1970

[21] Appl. No.: 95,475

[52] U.S. Cl. ..................408/26, 145/130, 83/667, 29/103 A, 30/388
[51] Int. Cl. ..............................B27b 5/12
[58] Field of Search...............30/167, 347; 29/103 R; 143/43 A, 43, 133 C; 144/218; 145/31 R, 130

[56] References Cited

UNITED STATES PATENTS

| | | | |
|---|---|---|---|
| 3,058,199 | 10/1962 | Cave et al. | 145/130 X |
| 1,781,564 | 11/1930 | Beattie | 143/133 C |
| 2,747,621 | 5/1956 | Stone et al. | 143/32 F |
| 48,759 | 7/1865 | Zimmerman | 144/219 |
| 1,407,837 | 2/1922 | Buckingham | 29/103 X |
| 2,629,113 | 2/1953 | Chafins | 143/133 C X |

*Primary Examiner*—Theron E. Condon
*Attorney*—Peter H. Firsht and John H. Crowe

[57] ABSTRACT

A rod is first grooved longitudinally along helical lines by broaching, milling, forging, or the like, after which a helical groove is cut by a threading die across the longitudinal grooves, the helixes of the grooves being oppositely directed to form cutting teeth having a leading chisel-like cutting edge from which a facing surface and a side surface trail, the included angle between the surfaces being acute. After wear, the teeth can be sharpened by reforming the grooves using dies of slightly smaller size. During cutting action, the rod saw develops thrust and tends to move lengthwise; a reaction member is provided to resist such movement and make for easier operation.

6 Claims, 7 Drawing Figures

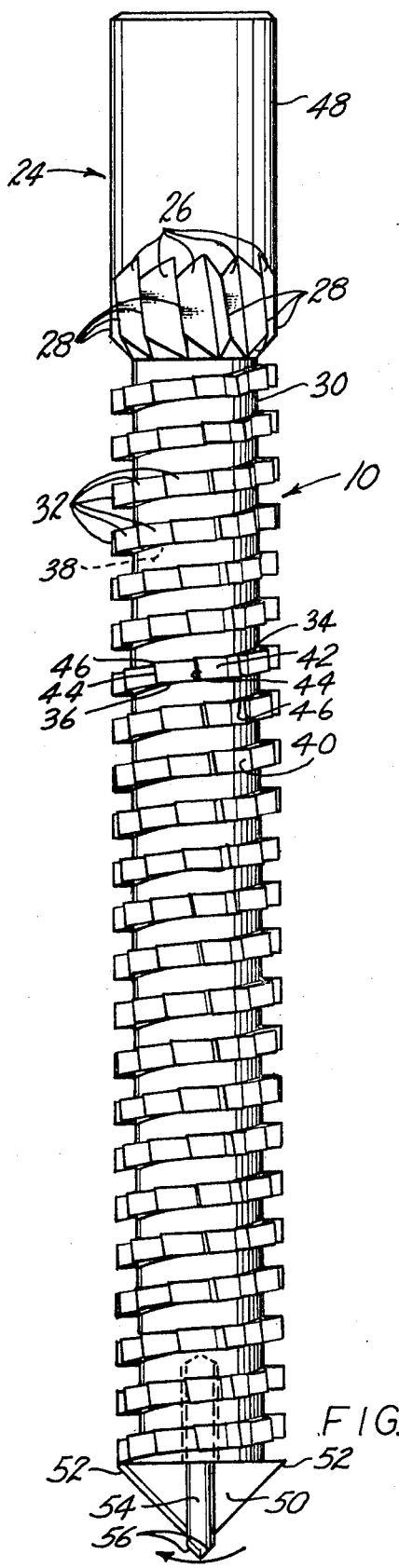
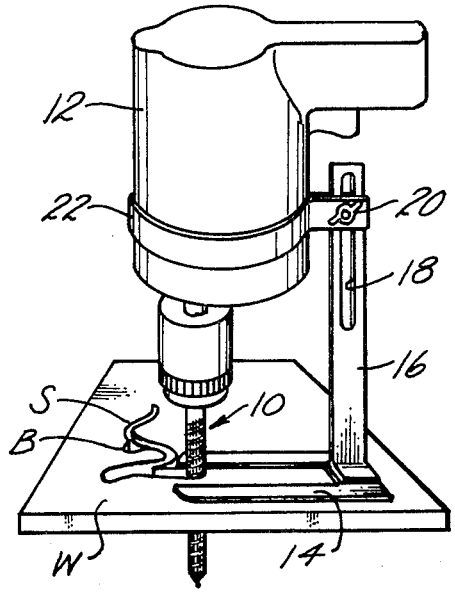
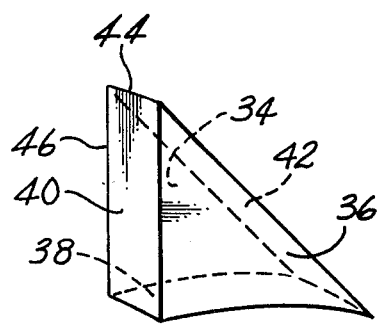
FIG. 1.
FIG. 3.
FIG. 2.
INVENTOR
THOMAS M. DETERLING
BY Peter H. Firsht
ATTORNEY INVENTOR.
THOMAS M. DETERLING
BY Peter H. First
ATTORNEY

ROTATING ROD SAW AND METHOD OF MAKING SAME

BACKGROUND OF INVENTION

The present invention relates to rotary cutting elements or implements and more particularly to a novel rotary rod saw adapted to be moved laterally during rotation for cutting a kerf or slot in a body of material, which slot can be straight or tortuous, or widened, as desired.

Various types of rotary cutting implements have been proposed. In some, cutting teeth have been spirally arranged circumferentially of a central rod, in others a screw thread has been cut on a rod, after which longitudinal grooves extending lengthwise of the rod parallel to the longitudinal axis thereof have been cut through the spiral screw thread in order to form cutting teeth. Such rotary implements have not proved to be entirely satisfactory due to the difficulty of maintaining the implement in operative relation to the workpiece because of the intermittent biting action of the teeth. Attempts to solve these problems have included oppositely spiralling the teeth from a central portion, or providing handholds for both hands, or a handhold and a rudder for guiding the implement.

SUMMARY OF THE INVENTION

It is therefore an object of the present invention to provide a novel rotating rod saw which operates in a steady and reliable manner and requires only that the rotating rod saw be held gently against the material of the workpiece.

Another object of the invention is to provide a rotating rod saw which thrusts itself against the material of the workpiece.

A further object is to provide a rotating rod saw which, during its cutting action, tends to cause the saw to move lengthwise, creating a thrust in a predetermined direction and having associated therewith a reaction member engaging the workpiece which resists such thrust.

Still another object is to provide a rotating rod saw having cutting teeth thereon formed with a surface facing in the direction of rotation, said facing surface meeting with a side surface to define a chisel-like cutting edge, from which said surfaces trail.

A still further object is to provide a rotating rod saw having cutting teeth formed with acute angle cutting edges disposed in echelon relation whereby the cutting teeth follow slightly different paths and each tooth cuts a small increment of material from the workpiece for smooth and effective operation.

Still another object is to provide a rotating rod saw in which the cutting teeth thereof are formed by oppositely directed grooves.

A still further object is to provide a novel method of making a rotating rod saw in which longitudinal grooves are formed lengthwise of the rod and a spiral groove is superimposed thereon.

Still another object is to provide a method of making a rotating rod saw in which a helical screw thread is first formed longitudinally of the rod and a helical screw thread is then spiralled about the rod.

Still another object is to provide a method of making a rotating rod saw which includes forming oppositely directed helical threads on a rod.

A still further object is to provide a method of making a rotating rod saw in accordance with the immediately preceding object in which one screw thread is formed longitudinally of the rod and a second screw thread is spiralled about the rod in crossing relation to the first screw thread.

Still another object is to provide a method of sharpening worn cutting teeth formed in accordance with the immediately preceding object by use of slightly smaller thread dies for recutting the longitudinally extending screw thread and the spirally arranged screw thread.

These and other objects and advantages of the present invention are achieved by providing a novel rotating rod saw in which cutting teeth are formed thereon by first grooving the rod longitudinally along helical lines, as by broaching, milling, stamping, forging, or the like, after which a helical channel or groove is cut across the longitudinal grooves, as by a threading die, the helixes of the grooves being oppositely directed. This results in cutting teeth having a leading cutting edge from which a surface facing in the direction of rotation of the rod extends in trailing relation. The side surface also trails from the cutting edge and the included angle between the facing surface and the side surface is less than a right angle to provide an acute chisel-like cutting edge. After wear, the teeth can be reshaped by recutting the grooves, using slightly smaller dies. First cutting the longitudinal grooves, and thereafter superimposing the spiral groove thereon, results in the formation of a series of cutting teeth arranged sequentially about a central rod portion, each tooth having a cutting edge without burrs. During rotation, the rod saw cutting teeth slice off incremental portions of the material of the workpiece, and the opposite direction of the helixes of the grooves causes the rod saw to move lengthwise and thrust itself deeper into the workpiece.

A reaction member is associated with the rod saw to resist such thrust and make for easier operation of the rod saw, whereby it is only necessary for the operator to move the rod saw gently against the uncut material of the workpiece, which movement can be forward or backward or sideways, or along a straight or tortuous path.

BRIEF DESCRIPTION OF DRAWINGS

FIG. 1 is a perspective view of one form of a rotating rod saw embodying the principles of the present invention shown powered by an electric drill motor and making a nonlinear cut in a piece of work;

FIG. 2 is an enlarged elevational view of the rod saw of FIG. 1, showing the substantially square cutting teeth formed thereon by cutting longitudinal and spiral grooves in the surface of a rod;

FIG. 3 is an enlarged perspective view of one of the cutting teeth of the rod saw of FIG. 2;

DESCRIPTION OF EMBODIMENTS

Figure 4:
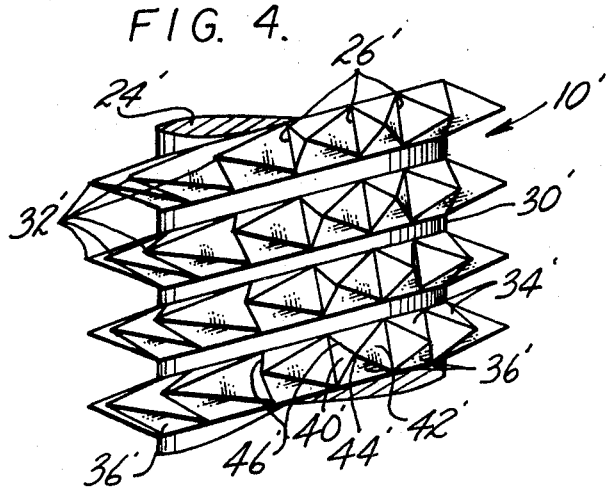
FIG. 4 is a fragmentary elevational view of a rod saw grooved longitudinally and spirally to provide pyramidal cutting teeth.

Referring to the drawings, there is shown in FIG. 1 a rotating rod saw 10 embodying the principles of the present invention, the rod saw being connected to an electric drill motor 12 for rotation thereby for cutting a kerf or slot S through a workpiece W, such as a wood board or metal plate or the like. As will later be made more clear, rotation of the rod saw causes it to move endwise, thrusting through the workpiece. To resist such thrust, there is provided a reaction member 14 which has fixed thereto an upright standard 16 having an elongated longitudinal slot 18 formed therein. Passing through the slot is a bolt-and-wing-nut combination 20 which also passes through the ends of a strap 22 encompassing the electric motor. The reaction member rests on the workpiece and the rod saw is adjustably related thereto. During operation, the rod saw is first made to penetrate the workpiece from above or the side, after which it can be moved forward or backward or laterally in a straight or tortuous path, to cut a slot of any desired design. For example, the slot can be the width of the rod, or broadened, as at B.

Inviting attention to FIG. 2, the rod saw 10 will now be described in greater detail. The rod saw consists essentially of an elongated body or rod 24 which has formed therein longitudinal grooves extending lengthwise of the body or rod along lines nonparallel to the axis of the rod, the grooves being formed in any suitable manner. More specifically, the grooves are formed along helical lines, as by broaching, milling, stamping, forging, or the like, and define therebetween ridges or crests of screw threads 28. Cutting across the grooves 26 is a spiral groove or channel 30 defining a helix opposite in direction to the helixes of the longitudinal grooves 26. That is, if the longitudinal grooves spiral to the left, then the spiral groove 30 is made to spiral to the right, and vice versa. The spiral groove can be formed by a threading die or other suitable means.

As a result of forming the longitudinal grooves 26 and the circumferential spiral groove 30, material is removed from the body 24, and cutting teeth 32 are formed thereon, sequentially arranged about the body and defining a helix. Each cutting tooth has a pair of generally triangularly shaped side surfaces 34 and 36 which extend from the opposite sides of a generally rhomboid base 38, better seen in FIG. 3. Extending from the other sides of the base 38 are surfaces 40 and 42 which meet at a chisel edge 44. The surfaces 40 and 42 have a substantially rhomboid shape. The surfaces 34 and 40 meet in a cutting edge 46 and the dihedral angle included between the surfaces is less than 90°, whereby such edge is the leading edge of a chisel-like formation.

With the grooves 26 and 30 helically arranged, as shown in FIG. 2, the rod saw is preferably rotated in the direction of the arrow, and the chisel-like cutting edge 46 of each tooth 32 advances with the surfaces 34 and 40 trailing therefrom. It is to be noted that the acute angle of intersection of the grooves 26 and 30 results in the teeth 32 being spirally arranged circumferentially of the body to define a helical thread and that the side surfaces 34 are inclined slightly, as viewed in FIG. 2.

Also, in any one lead or pitch of the spiral screw of the teeth, the teeth are arranged in echelon formation with respect to each other so that each tooth sweeps a path which is slightly different from the other teeth and cuts or slices off an increment of material of the workpiece W in sweeping such path, the side surface 34 of the tooth sliding along the newly cut material and causing slight binding to occur. However, the teeth need not have the "set" to prevent any slight binding that occurs. In fact, slight binding is beneficial in that it tends to cause the rod saw to move or thrust longitudinally which action, in conjunction with the reaction member 14, assists the cutting action of the rod saw.

The dimensions of the rod saw 10, the pitch of the longitudinal and spiral helixes, the profile and the number of teeth in each pitch, and speed of rotation will depend upon the type of material of which the rod saw is made and through which it is required to cut. This variability provides for adaptability of the rod saw for cutting different types of materials.

For attachment to power means such as a motor 12 or the like, the rod saw has a chuck, or attachment, end 48. A boring tip 50 having cutting edges 52 and a starting tip 54 with cutting edges 56 is provided for initial penetration of the workpiece W.

It is believed that the operation of the rotating rod saw 10 of the present invention is clearly understood and is briefly summarized at this point. With the rod saw rotating rapidly, the starting tip 54 is applied to the workpiece W and pressure is exerted downwardly, after which the cutting edges 52 of the tip 50 engage the workpiece and bore a hole therethrough. The reaction member 14 is adjusted relative to the rod saw so that the intermediate portion of the rod saw engages the material of the workpiece and can be moved in any desired direction to cut a slot S of desired design and width by suitable movement of the rod saw. Although the rod saw has been shown in operation pointed downwardly, it will be appreciated that it would operate as well in other positions, such as horizontally for cutting a kerf or opening in a wall, or pointed upwardly in the case of a ceiling, or in any position between the horizontal and the vertical, as desired.

Movement of the rod saw against the uncut material of the workpiece W causes the chisel-like cutting edges 46 to bite into the uncut material and, in turn, chisel or slice off a small increment thereof, the cut particles of the material sliding along the facing surface 40 into the grooves 30 and being centrifugally expelled therefrom behind the rod saw. The side surface 34 slides along the newly cut material so that the rod saw tends to cut a "thread" in the material but is prevented from doing so by the reaction member 14. Thus, the thread is constantly stripped into particles. The particles of material can drop from the slot S or remain therein without binding or otherwise affecting the operation of the rod saw. The rod saw of the present invention requires only that it be held gently against the material of the workpiece to operate in a steady and reliable manner, and has the advantage that the effort required on the part of the operator is minimized.

It will be appreciated, of course, that the cutting teeth of the rod saw can be varied as necessary or desired. For example, instead of forming teeth which are substantially square, as previously described, an Acme thread die can be employed, or a buttress-type thread die or a National Standard thread die, or any modification of the same.

Figure 5:
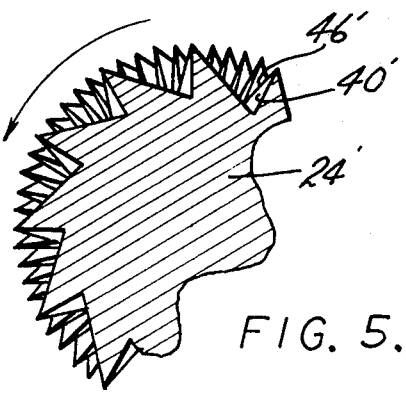
FIG. 5 is a fragmentary cross-sectional view of the rod saw of FIG. 4, illustrating the echelon arrangement of the cutting teeth.

Accordingly, FIG. 4 shows a portion of a rod saw 10' having teeth 32' of pyramidal shape formed by first grooving a body 24' longitudinally, as before, with longitudinal grooves 26', and then employing a modified National Standard thread die cutting across the longitudinal grooves to form a spiral channel or groove 30'. The resulting pyramidal teeth 32' have triangular side surfaces 34' and 36', a triangular facing surface 40' facing in the direction of rotational movement of the rod saw, and a triangular back surface 42', the several triangular surfaces corresponding to the surfaces referenced by similar but non-primed numerals in FIG. 2, and meeting at a point 44'. The surfaces 34' and 40' meet in a cutting edge 46' and the dihedral angle between the surfaces is less than a right angle so that the surface 40' trails behind the cutting edge and provides therewith a chisel-like cutting action. As shown in FIG. 5, which is a view looking toward the attachment end, the teeth are arranged in echelon formation. The operation of this form of the rod saw 10' is essentially the same as for the rod saw 10, a reaction member such as member 14 of FIG. 1 being associated therewith to resist the thrust developed by the cutting action of the rod saw.

Figure 6:
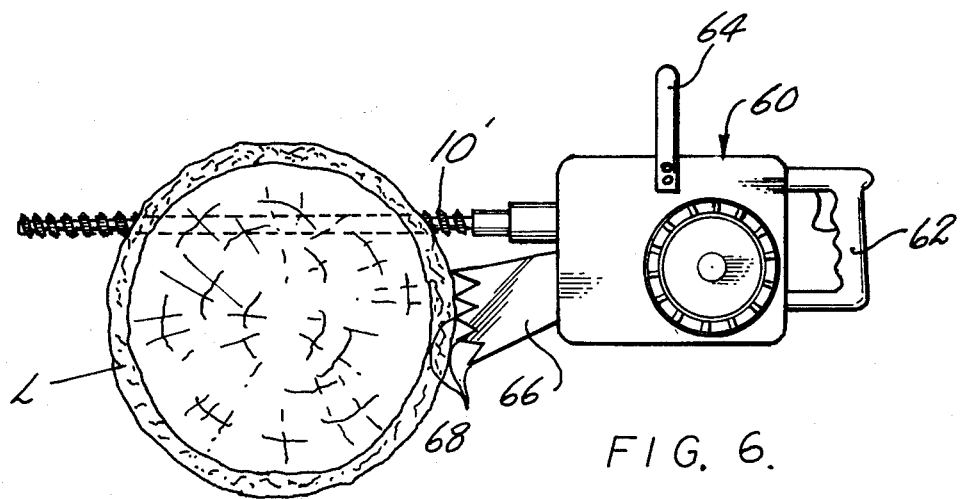
FIG. 6 is a side elevational view of the rod saw of FIG. 4, illustrating its use with a gasoline engine to cut a log.

It will be appreciated that the rod saws 10 and 10' can be rotated by any suitable power means and operated in other than the vertical position. For example, as shown in FIG. 6, the rod saw 10' (or 10) can be attached to a portable gasoline engine 60 having hand holds 62 and 64 and a reaction member 66 notched to have serrations or teeth 68 adapted to engage a log L or other workpiece for disposing the rod saw transversely thereof to cut the same. The rod saw is operated in a manner similar to a conventional chain saw. Thus, the rod saw is inclined with respect to the horizontal, and the lowermost teeth of the reaction member engage the side of the log, after which the gasoline engine is manipulated to feed the rotating rod saw down into the log, pivoting about the teeth of the reaction member, and so on.

Figure 7:
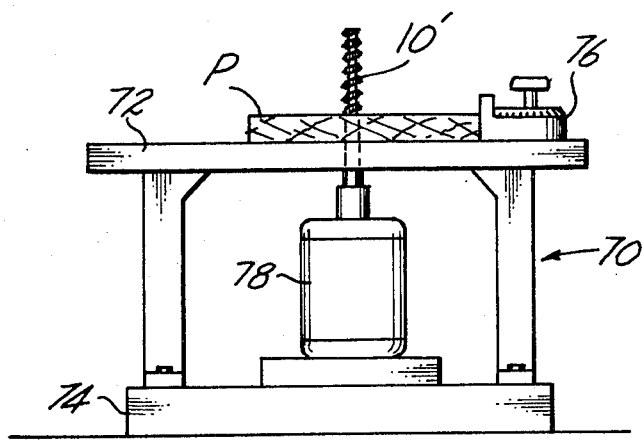
FIG. 7 is an elevational view of the rod saw of FIG. 4, driven by a motor and used with a stationary table which serves as a reaction member.

The rod saw 10' (or 10) can also be used with a bench saw 70 having a stationary table or bed 72 anchored to a base 74 and an adjustable guide or gauge 76 against which a workpiece such as a board or plank P is guided, as shown in FIG. 7. The rod saw is disposed in upstanding relation from the table and is adapted to be driven by a motor 78 with a rotational direction that develops a thrust lengthwise of the rod saw, tending to draw the plank P against the top of the table, which serves as a reaction member resisting such thrust. In operation, workpiece P has a leading edge thereof forced gently against the rod saw which progressively cuts a kerf or slot therein as the workpiece is guided or moved thereagainst.

Inasmuch as the rod saws of FIGS. 6 and 7 have the intermediate tooth portion thereof applied against the perimeter or edge of the workpiece, boring tips are unnecessary and have been omitted, However, such tips can be provided, if desired.

There has thus been provided a rotating rod saw which is highly effective and reliable in operation and urges itself against the workpiece with a minimum of effort on the part of the operator, and performs its cutting operation in a steady and efficient manner without excessive binding for cutting, in a workpiece, a kerf or slot, narrow or wide, which can be straight, circular, or angular, following a forward or backward or sideward path, as desired.

Although the present invention has been herein shown and described in what are believed to be the most practical and preferred embodiments thereof, it is to be understood that many variations thereof are possible, and the present invention is not to be limited to such detail but is to be accorded the full scope of the appended claims.

Having described the invention, what is desired to be secured by Letters Patent is:

1. A rotating rod saw comprising:
   an elongated body adapted to be rotated in a predetermined direction and having a plurality of helical grooves extending longitudinally thereof, said body also having a helical channel spiralling circumferentially thereabout and intersecting the helical grooves for forming a continuous row of cutting teeth, each tooth having a pair of laterally extending surfaces meeting at an acute dihedral angle and forming a substantially radial cutting edge from which the surfaces trail, one of the surfaces facing in the direction of rotation of the body, and the other surface forming a portion of one side of the channel.

2. The rod saw of claim 1 wherein each tooth has a generally rhomboid base having a longitudinal axis generally parallel to said channel, and said cutting edge of the tooth extends from an acute corner of the base.

3. The rod saw of claim 2 wherein said surface facing in the direction of rotation of the body is a front surface which extends from a short side of the base and the other surface is a generally triangular side surface which extends from a long side of the base, each tooth further including a generally triangular side surface extending from the other long side of the base and an inclined back surface extending from the other short side of the base.

4. The rod saw of claim 1 wherein said body has an attachment end adapted to be connected to power means for rotating the body in said predetermined direction of rotation, and said longitudinal helical grooves extend from said attachment end pitched in a direction opposite to the direction of rotation of the body, and said helical channel is pitched in the direction of rotation of the body and has a pitch which is relatively lower than that of the helical grooves.

5. The rod saw of claim 4 wherein said body, during rotation, is adapted to be engaged with a piece of material for cutting the same, engagement of the rotating body with the material causing said cutting edge to slice off an increment of the material which slides along said surface facing in the direction of rotation of the body, and said other surface slides along the newly cut material creating thrust forces tending to move the body longitudinally, and a reaction member associated with the body for resisting the thrust forces.

6. The rod saw of claim 1 wherein the cutting edges of the teeth are burrless as a result of first forming the longitudinal helical grooves and thereafter forming the helical channel in traversing relation to the grooves.

* * * * *